June 27, 1967  J. C. HORVATH  3,327,481
SOLID PROPELLANT ROCKET MOTOR RESONANCE SUPPRESSION RINGS
Filed Oct. 18, 1966  2 Sheets-Sheet 1
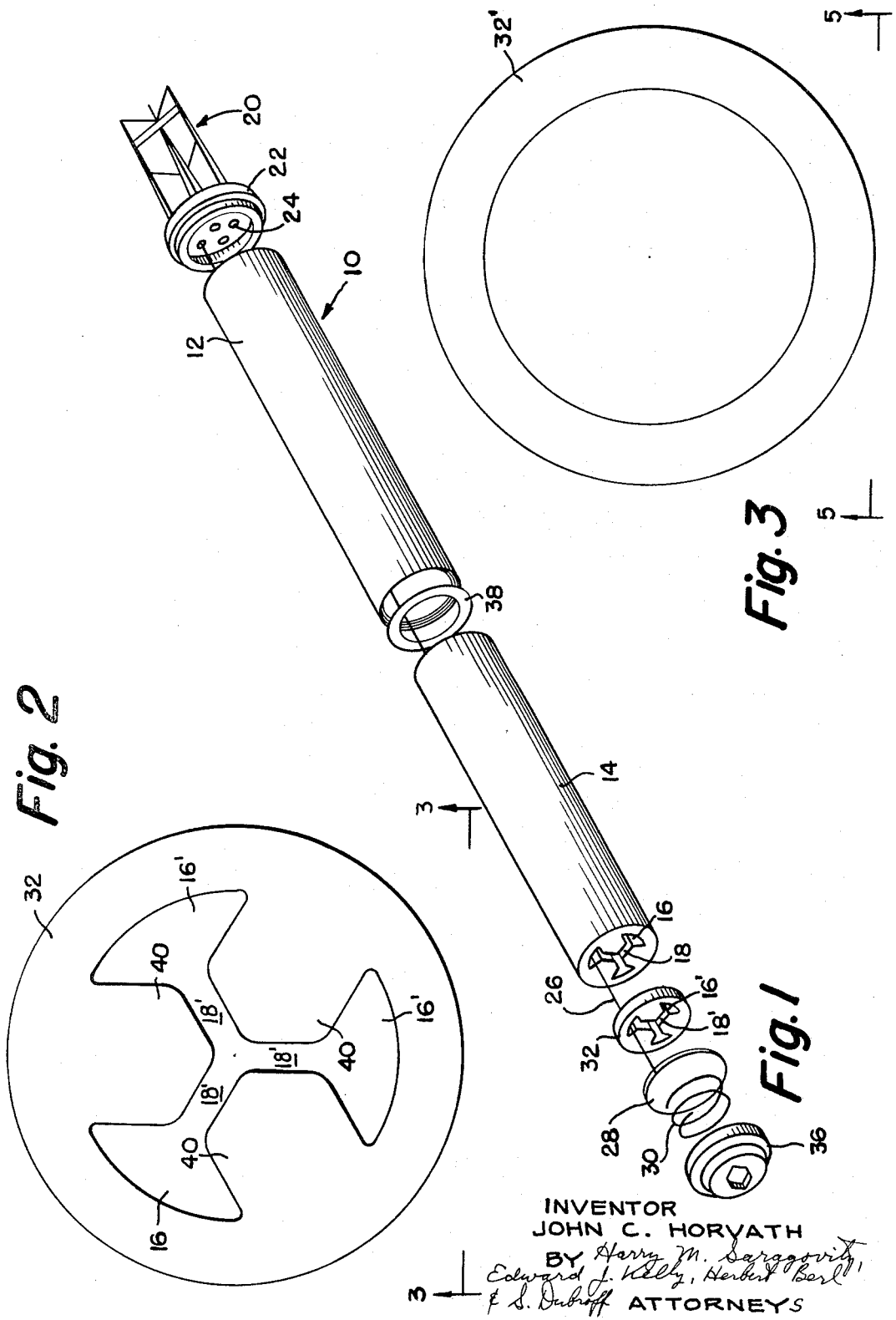
INVENTOR
JOHN C. HORVATH
BY Harry M. Saragovitz
Edward J. Kelly, Herbert Berl
& S. Dubroff ATTORNEYS INVENTOR
JOHN C. HORVATH
BY Harry M. Saragovitz
Edward J. Kelly
Herbert Berl & S. Bubroff
ATTORNEYS

United States Patent Office 3,327,481
Patented June 27, 1967

3,327,481
SOLID PROPELLANT ROCKET MOTOR RESONANCE SUPPRESSION RINGS
John C. Horvath, Raap, Va., assignor to the United States of America as represented by the Secretary of the Army
Filed Oct. 18, 1966, Ser. No. 588,255
8 Claims. (Cl. 60—255)

ABSTRACT OF THE DISCLOSURE

A resonance suppressor ring, composed of ethyl cellulose and potassium sulfate, interposed between a propellant grain and an igniter of a nitrocellulose base, solid propellant rocket system to cool the propellant and reduce motor resonance.

---

The invention relates to a nitrocellulose base, solid propellant rocket motor assembly and more particularly to the use of resonance suppression rings in a nitrocellulose base, solid propellant rocket motor assembly.

In the past the method of resonance suppression in rocket motors utilized three rods coated with a cruciform sheath of ethyl cellulose and potassium sulfate. These rods were inserted into the perforations of the propellant grain and held in place by attachment to the metal immobilizer spring at the head end of the motor. The melting point of the ethyl-cellulose and potassium sulfate cruciform was approximately 280° F. and since the flame temperature of the propellant far exceeded this temperature, the ethyl-cellulose and potassium sulfate cruciform was leaving the motor before the propellant burning was complete. The location of the rods in the perforation of the grain was such that the effective action of the potassium sulfate was not in the system long enough or located so that it was effective at the actual burning surface of the propellant.

The present invention has solved this problem by eliminating the motor resonance experienced in rocket motor firing at both 75° F. and 135° F. The strategic placement of the ethyl cellulose potassium sulfate in the form of a molded ring on the propellant effectively reduces this resonance without appreciably changing other ballistic parameters.

It is therefore an object of the present invention to provide a nitrocellulose base, solid propellant rocket motor assembly utilizing a resonance suppression ring.

Another object is the provision of a nitrocellulose base, solid propellant rocket motor assembly utilizing an ethyl cellulose-potassium sulfate ring in the head end of the propellant grain.

A further object is to provide a nitrocellulose base, solid propellant rocket motor assembly having potassium sulfate retained in the motor throughout the full burning time of the propellant.

Still another object is the provision of a nitrocellulose base, solid propellant rocket motor assembly having potassium sulfate fed into the system parallel to the burning surface.

A still further object is to provide a nitrocellulose base, solid propellant rocket motor assembly having a notable reduction in maximum resonance amplitude.

An additional object is the provision of a nitrocellulose base, solid propellant rocket motor assembly utilizing a resonance suppression ring which does not adversely affect the other ballistic parameters such as action time, total impulse and maximum pressure.

The above objects as well as others together with the benefits and advantages of the invention will be apparent upon reference to the detailed description set forth below, particularly when taken in conjunction with the drawings annexed hereto in which:

FIG. 1 illustrates an isometric view of a nitrocellulose base, solid propellant rocket motor assembly.

FIG. 2 illustrates a plane view of a resonance suppression ring.

FIG. 3 illustrates a plane view of another embodiment of a resonance suppression ring.

Figure 4:
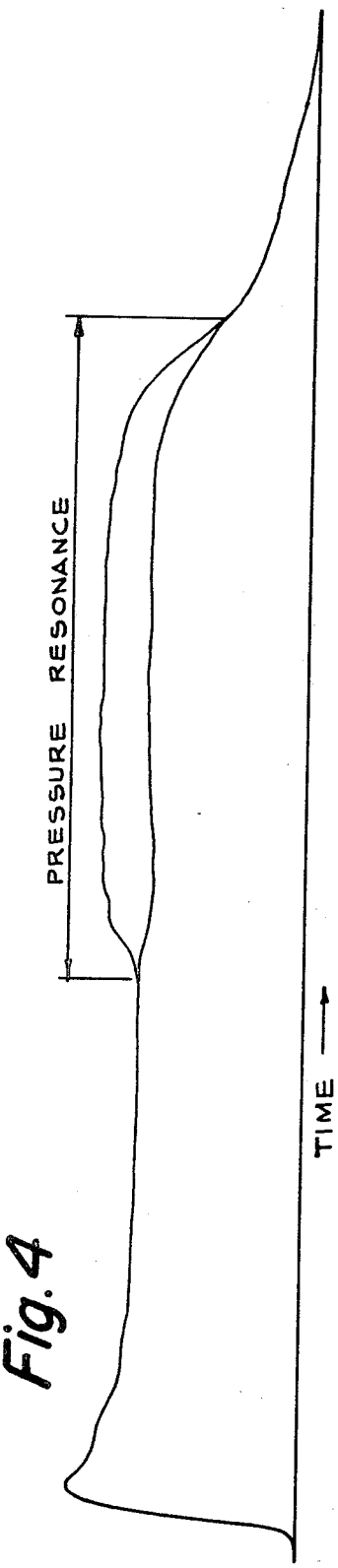
FIG. 4 illustrates pressure time traces of the prior art nitrocellulose base, solid propellant rocket system.

As can be seen in FIG. 1, a nitrocellulose base, solid propellant rocket motor assembly 10 includes a hollow cylindrical body 12. The hollow cylindrical body 12 houses a cast double base propellant grain 14 which is of a solid cylindrical shape having three slots 16 attached to each other by three connecting perpendicular slots 18. A tail fin assembly 20 is integral with a nozzle 22 having four vent holes 24 therein. The vent holes 24 are to allow the gases from the burning propellant to escape from the motor 10. Extending through one of said vent holes 22 is an electrical ignition wire 26 attached at one end to an electrical initiating means (not shown) and at the other end to an igniter 28. The igniter 28 is biased by spring 30 against a resonance suppression ring 32 which is the same configuration as the propellant grain 14 having three slots 16' each perpendicularly connecting three passageways 18'. The resonance suppression ring 32 is thereby held against the propellant grain 14 by a mixture of two parts ethyl lactate and one part butyl acetate. The igniter 28 is held against the ring 32 by the closure cap 36 which screws into the body 12. A rubber seat ring 38 is provided between the closure cap 36 and the body 12 to insure a tight fit.

As can be seen in FIG. 2, the resonance suppression ring 32 is constructed with three lobes 40 which define the three slots 16' connected by three passageways 18 as seen in FIG. 1.

The resonance suppression ring 32', as seen in FIG. 3, is of a different configuration than the embodiment of FIG. 2 in that it does not have the same slots and passageways as described therein. The resonance suppressor ring 32' is doughnut shaped.

Both the embodiments of FIGS. 2 and 3 are manufactured by a composition of ethyl cellulose and potassium sulfate and can be either manufactured as a molded unit or can be stamped from sheet stock which had been previously rolled and sheeted to a fully consolidated matrix.

An example of the use of the present invention is in a 115 mm. rocket motor assembly. The resonance system was statically tested in the 115 mm. rocket system. During these tests, pressure-time traces (FIGS. 4 and 5) were recorded which permitted prompt and accurate comparison of the present invention with the prior art. In reviewing these static firing traces, it was observed that one of the phenomena that contributed to the poor performance of the unit is the unusually high prevalence of pressure resonance at hot temperatures. It was thereby proven that if the potassium sulfate was retained in the motor throughout the full burning time of the propellant and was fed to the system parallel to the burning surface it would more effectively cool the combustion products of the propellant and thereby reduce motor resonance. These traces clearly depict the marked improvement or reduction of resonance effected by the ethyl cellulose-potassium sulfate ring component.

FIG. 4 is a typical pressure-time trace of the rocket motor when statically fired at 135° F. using the rod suppression (prior art) concept. It can be noted that the start of pressure resonance (upper trace) occurs after about one-third of burning time.

Figure 5:
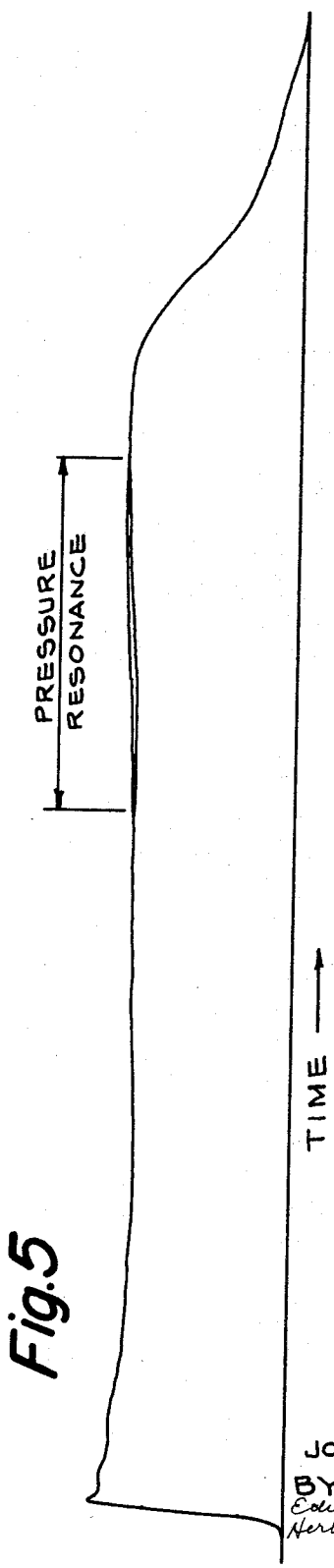
FIG. 5 illustrates pressure time traces of the inventive, nitrocellulose base, solid prpoellant rocket system.

FIG. 5 is a typical pressure-time trace of the 115 mm. rocket motor fired statically at 135° F. using the ethyl cellulose-potassium sulfate resonance suppression disc or ring. As can be noted the amplitude of the pressure resonance is reduced considerably.

The following chart illustrates the tabulated test data of the above mentioned firings.

|  | Prior Art | Invention |
|---|---|---|
| Maximum resonance amplitude (p.s.i.) | 347 | 55 |
| Maximum standard deviation | 388.8 | 16.5 |

As shown by the above data, there is a notable reduction in maximum resonance amplitude when the ethyl cellulose-potassium sulfate disc or ring is used in lieu of the rod concept (prior art) for suppression purposes.

The use of the resonance suppression ring does not adversely affect the other ballistic parameters such as action time, total impulse and maximum pressure.

While the above example relates only to the 115 mm. rocket, the ethyl cellulose-potassium sulfate resonance suppression disc is adaptable to any nitrocellulose base, solid propellant rocket system.

The concept of resonance suppression could be utilized in any number of solid propellant rocket motors provided the ratio of the weight of the ring, propellant weight and burning rate of the propellant is properly adjusted. For example, if the propellant grain weighs twenty-one pounds, as in the above mentioned 115 mm. rocket, the suppression disc should weigh anywhere in the range of 3 to 3½ ounces. Therefore, as the burning rate of the propellant increases the disc increases.

The location of the ethyl cellulose-potassium sulfate ring can be varied depending on the design of the propellant. In some cases a ring at the head end of the propellant grain may be all that is necessary. However, supplemental rings can be placed at the nozzle end of the grain or in case of a multiple propellant grain charge the rings can be used as spacers in the assembly.

Obviously many modifications and variations of the present invention are possible in light of the above teachings. It is therefore to be understood, that within the scope of the appended claims, the invention may be practiced otherwise than as specifically described.

I claim:
1. In a nitrocellulose base, solid propellant rocket motor assembly comprising
   a hollow cylindrical body,
   a nozzle secured to one end of said body,
   said nozzle having a plurality of vent holes therein,
   a tail fin assembly integral with said nozzle,
   a cast double base propellant grain contained in said body,
   an igniter adjacent said propellant grain at the other end of said body,
   a spring attached to said igniter,
   a closure cap biasing said spring against said propellant thereby securing it in said body,
   an igniter cord passing through said propellant grain and said vent holes and attached to said igniter,
   a rubber seal ring provided between said body and said closure cap,
   the improvement wherein
      a resonance suppressor ring composed of ethyl cellulose and potassium sulfate is interposed between said propellant grain and said igniter to cool the combustion products of the propellant and reduce motor resonance.
2. An assembly of the type described in claim 1 wherein the configuration of the resonance suppressor ring is the same as that of the propellant grain.
3. An assembly of the type described in claim 1 wherein said resonance suppressor ring is secured to said propellant grain by a mixture of ethyl lactate and butyl acetate.
4. An assembly of the type described in claim 1 wherein said resonance suppressor ring is doughnut shaped.
5. An assembly of the type described in claim 1 wherein said resonance suppressor ring is of a molded unitary construction.
6. An assembly of the type described in claim 1 wherein said resonance suppressor ring comprises a rolled, sheet stock stamping.
7. In a nitrocellulose base, solid propellant rocket motor assembly comprising:
   a hollow cylindrical body,
   a nozzle secured to one end of said body,
   said nozzle having a plurality of vent holes therein,
   a tail fin assembly integral with said nozzle,
   a cast double base propellant grain contained in said body,
   an igniter adjacent said propellant grain at the other end of said body,
   a spring attached to said igniter,
   a closure cap biasing said spring against said propellant thereby securing it in said body,
   an igniter cord passing through said propellant grain and said vent holes and attached to said igniter,
   a rubber seal ring provided between said body and said closure cap,
   the improvement wherein
      a resonance suppressor ring, having a plurality of slots connected together by a plurality of passageways, is interposed between said propellant grain and said igniter to cool the combustion products of the propellant and reduce motor resonance.
8. An assembly of the type described in claim 7 wherein said passageways are each perpendicular to their respective slots.

References Cited

UNITED STATES PATENTS

| 2,469,350 | 5/1949 | Lauritsen. |  |
| 2,529,465 | 11/1950 | Wallace et al. | 60—255 |
| 2,750,887 | 6/1956 | Marcus | 60—255 X |
| 2,876,620 | 3/1959 | Weinland et al. | 60—255 |
| 2,990,684 | 7/1961 | Cohen | 60—255 |
| 3,027,709 | 4/1962 | Welder | 60—255 |
| 3,243,956 | 4/1966 | Hamm et al. | 60—255 |

CARLTON R. CROYLE, *Primary Examiner.*